March 7, 1967  J. HALMENSCHLAGER  3,307,705
DISPOSABLE OIL FILTER FOR AUTOMOBILE ENGINES
Filed Sept. 23, 1963
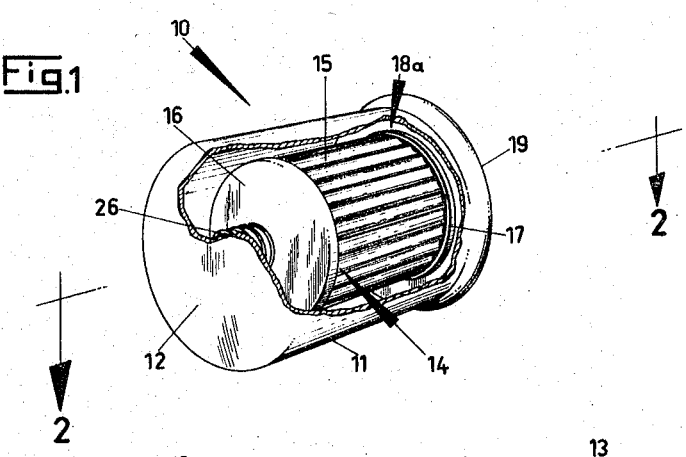
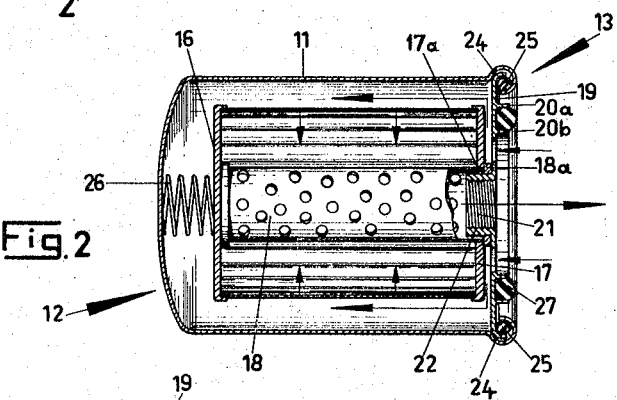
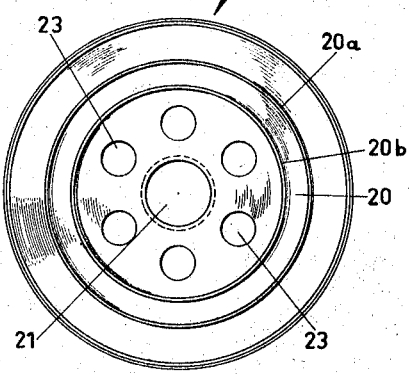
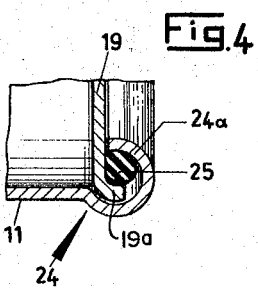
INVENTOR
Josef Halmenschlager

United States Patent Office 3,307,705
Patented Mar. 7, 1967

3,307,705
DISPOSABLE OIL FILTER FOR AUTOMOBILE
ENGINES
Josef Halmenschlager, Montreal, Quebec, Canada
(340 Lebeau Blvd., St. Laurent, Quebec, Canada)
Filed Sept. 23, 1963, Ser. No. 310,624
3 Claims. (Cl. 210—443)

This invention relates generally to oil filters and more particularly to an improved form of oil filter of the type normally mounted at a convenient location on an engine block.

It is conventional practice to mount an oil filter of the flow or bypass type on an automobile engine block, such filters ideally effecting a complete seal therewith while being in communication with the interior thereof, oil being ducted into the filter via a plurality of orifices formed in the end cap, the cap being located over cooperable parts in the engine block.

Upon the oil having passed through the filtering medium within the body of the filter (such a medium generally comprising a chemically treated, paper formed into corrugations or the like) it is ducted therefrom via a perforated metal tube which is located centrally within the filtering medium and a pipe extension, one end of which is threadably connected to a flange member located centrally within the oil filter end cap the opposite end thereof being connected directly to a pump unit.

While the current design of oil filter serves its intended purpose relatively efficiently it has, nevertheless, certain characteristics not least of which is its tendency to permit leakage of oil directly from the engine block.

This occurrence is brought about by the method of construction of the conventional oil filter end cap which normally consists of a two part assembly including a relatively heavy sheet metal flange or stamping set into a light sheet metal cap, flange and cap being held together by a spot welding at a plurality of points, whereafter the sheet metal cap has its peripheral edge rolled downwardly over the edge of that filter housing.

The filter is then mounted in position and "spun" or screwed onto the engine block, the metal flange having an internal thread formed thereon for the reception of one end of the aforementioned extension pipe.

A conventional O ring is utilized to achieve a good seal between the engine block and the filter end cap, such an O ring generally being affixed to the end cap by a bonding medium prior to assembly of the unit to an engine block.

Leakage, however, invariably occurs in this perfect form due to the oil finding its way between the sheet metal cap and the flange member via the welding spots, capilliary action causing a constant seepage once the oil has passed therebetween.

It is therefore a primary object of the instant invention to provide an improved oil filter for the use on automatic engines referred to hereinafter by the term oil filter which completely and effectively eliminates oil leakage between the filter end cap and the central tube.

It is another important object of this invention to provide an oil filter, the end cap of which is of single unit construction.

Still another object of the invention seeks to provide an oil filter, the O ring used in conjunction therewith not requiring to be bonded thereto.

Yet another object of this invention resides in the provision of an oil filter, the filter housing of which has a peripheral lip formed thereon for the reception of the end cap member prior to roll down fixing.

A further object of the invention as herein described is to provide an improved oil filter which while embodying the aforementioned advantages is nevertheless simple to manufacture and relatively inexpensive to produce.

These and other various other pertinent objects and features of my invention will become more readily apparent from the following description of parts and assemblies and when taken in conjunction with the accompanying drawings in which like character of reference designate like parts in the several views and in which:

FIG. 1 is a part cut away filter embodying the instant invention.

FIG. 2 is a sectional side observation of the invention as illustrated in FIG. 1 taken on the line 2—2 and showing the structure of the oil filter end cap and the method of assembly thereof to the filter housing.

FIG. 3 is an end view of the end cap and its cooperable O ring.

FIG. 4 is an enlarged fragmentary view of the invention showing a preferred method of affixing the end cap to the main body of the filter housing.

Referring to FIGS. 1 and 2, an oil filter generally designated by the arrow 10 includes a hollow cylindrical housing 11 having a sealed end 12 and a capped end 13.

A conventional filter unit 14, including a corrugated paper medium 15 or the like having end plates 16 and 17 respectively, has a centrally located perforated tube 18 of light metal on a flange 18a. It will readily be apparent that end plate 17 has an orifice 17a formed centrally therein, orifice 17a allowing flanged tube 18 to pass therethrough, the underside of flange 18a bearing against plate 17.

Referring now to FIGS. 1, 2 and 3 an end cap 19 includes a one piece circular unit having an outside diameter at least equal to and preferably slightly in excess of the outside diameter of housing 11.

Cap 19 has formed on its outer face an annular groove or trough 20, trough 20 being defined by raised wall sections 20a and 20b respectively. A threaded orifice 21, formed centrally through end cap 19 is defined on the inner side of cap 19 by a flange 22 the inner peripheral surface of which bears the continued thread of orifice 21.

A plurality of spaced apart ports 23 are formed through end cap 19, ports 23 being located around orifices 21 and inwardly of trough 20.

Referring particularly to FIGS. 2 and 4, it will be seen that housing 11 has a lip section 24 formed on capped end 13, lip 24 being adapted to accommodate flange 19a at the peripheral edge of cap 19, whereafter an extension section 24a of lip 24 is rolled over through substantially 180 degrees to trap cap 19 in position, a standard resinous sealing compound 25 being located on cap 19 before roll forming is commenced. It will be noted that flange 19a protrudes axially from the outer surface of cap 19 and its outer edge portion is substantially perpendicular to the main plane of cap 19. Moreover, the outer peripheral surface of the flange 19a is circular in cross-section and protrudes radially outwardly from the inner surface of filter housing 11. Thus, lip section 24 protrudes radially outwardly from the cylindrical wall 11 of the housing and a seat is formed between flange 19a and said lip section 24, to retain the cover 19 against axial displacement within housing 11. The lip extension 24a has its free edge adjacent to the outer surface of cap 19, and its free end portion makes substantially a right angle with said outer surface of cap 19 and is spaced radially inwardly from flange 19a so as to define a space between lip section 24a and flange 19a in which is exposed an annular portion of the outer surface of cap 19. This space is filled with the above-noted sealing compound 25. Said compound 25 under the action of oil pressure within the housing is wedged between the lip section 24 and flange 19a and makes good sealing contact with the outer face of cap 19 and the inside face of the lip section 24a. This arrangement effects good sealing which will resist the usual high pressure of the oil within the housing 11. Moreover, the above-noted method of sealing the cover 19 to the housing 11 enables to use a housing 11 of thin sheet metal and cap 19 of thicker material as in the usual constructions of screw type filters, and this without having to make the end cap of two parts, which is, as noted above, the conventional filter housing construction. Referring to FIGS. 1, 2 and 3, filter unit 14 has a helical spring member 26 attached to end plate 16 thereof, spring 26 biasing filter 14 towards end cap 19 thereby ensuring a positive seal between flange 18a and end cap 19 upon final assembly.

One or more grooves or troughs 20 of different dimensions may be provided to allow this filter to be used on different engines guaranteeing sealing.

Prior to assembly of filter unit 10 to the bolck of an engine an O ring 27 of substantially round profile is located within trough 20, O ring 27 forming a seal between end cap 19 and the body of the engine block against which it is assembled.

It should be noted that O ring 27 should be capable of being depressed within trough 20 to such a point whereby its outer peripheral edge is level with the top of raised sections 20a and 20b thereof, without rolled lip sections 24 coming into interference by contact with the engine block.

During operation of oil filter 10, oil circulation in the normal manner therethrough as indicated by broken arrows 28, passing through tube 18 thereafter flowing through an orifice 21 and into the engine bearings, no leakage being possible due to the one piece form of end cap 19.

It is suggested that end cap 19 be formed from such material as rustless cast white metal or the like or, alternatively, formed from a moulded plastic.

The general design of the individual parts of the invention as described above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. In a screw type filter comprising a cylindrical housing and a flat circular end cap closing one end of said housing and having an inner surface facing inwardly of said housing and an outer surface, said end cap having a central inwardly threaded flanged orifice and a plurality of spaced apart ports located around said central orifice, said end cap having at its outer surface an annular trough surrounding said central orifice and said ports, an O ring located within said trough, said end cap having at the peripheral edge thereof a flange extending outwardly therefrom, said cylindrical housing having, at the peripheral edge of its open end, a lip protruding radially inwardly of said housing, having an arcuate cross-section and surrounding said flange and having a lip extension disposed adjacent a zone of said outer surface of said end cap spaced radially inwardly from said flange to define a trough-like space between said flange and lip extension in which an annular portion of said outer surface is exposed, a sealant in said space in sealing contact with said annular portion of the outer surface of said end cap and the inner surface of said lip extension, and end cap abutment means formed by said housing and engaging said end cap inner surface to retain said end cap against displacement inwardly of said housing.

2. In a screw type filter comprising a cylindrical housing and a flat circular end cap closing one end of said housing and having an inner surface facing inwardly of said housing and an outer surface, said end cap having a central inwardly threaded flanged orifice and a plurality of spaced apart ports located around said central orifice, said end cap having at its outer surface an annular trough surrounding said central orifice and said ports, an O ring located within said trough, said end cap having at the peripheral edge thereof a flange extending outwardly therefrom, said cylindrical housing having, at the peripheral edge of its open end, a lip protruding radially inwardly of said housing, having an arcuate cross-section and surrounding said flange and having a lip extension disposed adjacent a zone of said outer surface of said end cap spaced radially inwardly from said flange to define a trough-like space between said flange and lip extension in which an annular portion of said outer surface is exposed, a sealant in said space in sealing contact with said annular portion of the outer surface of said end cap and the inner surface of said lip extension, and wherein said flange has an outer peripheral surface protruding radially outwardly from the inside cylindrical surface of said housing, and said lip forms an axially inclined inner surface against which seats said outer peripheral surface of said end cap flange.

3. In a screw type filter as claimed in claim 2, wherein said lip and lip extension are rolled over through substantially 180°, so that the outer end portion of said lip extension is substantially at right angles to the outer surface of said end cap.

References Cited by the Examiner
UNITED STATES PATENTS

| | | | |
|---|---|---|---|
| 874,346 | 12/1907 | Krummel | 220—67 |
| 2,374,481 | 4/1945 | Godshalk. | |
| 2,432,790 | 12/1947 | O'Larte et al. | 220—67 X |
| 3,044,475 | 7/1962 | Thompson. | |
| 3,184,062 | 5/1965 | Humbert. | |

REUBEN FRIEDMAN, *Primary Examiner.*

F. W. MEDLEY, *Assistant Examiner,*